United States Patent
Siu et al.

(10) Patent No.: US 9,853,332 B2
(45) Date of Patent: Dec. 26, 2017

(54) CONTINUOUS CIRCUIT AND FUSE PROTECTION IN HIGH VOLTAGE APPLICATIONS EXPOSED TO CHEMICALLY HARSH ENVIRONMENTS

(71) Applicant: GM Global Technology Operations LLC, Detroit, MI (US)

(72) Inventors: Cammi L. Siu, Macomb, MI (US); Michael A. Celotto, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 194 days.

(21) Appl. No.: 14/862,381

(22) Filed: Sep. 23, 2015

(65) Prior Publication Data

US 2017/0084962 A1    Mar. 23, 2017

(51) Int. Cl.
  *H01M 10/48* (2006.01)
  *H01M 10/04* (2006.01)

(52) U.S. Cl.
  CPC .......... *H01M 10/48* (2013.01); *H01M 10/04* (2013.01); *H01M 2220/20* (2013.01)

(58) Field of Classification Search
  CPC .... H01M 10/48; H01M 10/482; H01M 10/42; H01M 10/425; H01M 10/4235; H01M 10/04; H01M 10/0445; H01M 2200/103; H01M 2220/20
  See application file for complete search history.

(56) References Cited

U.S. PATENT DOCUMENTS

| | | | |
|---|---|---|---|
| 9,722,231 B2* | 8/2017 | Soleski | B60L 3/0046 |
| 2010/0209748 A1* | 8/2010 | Kudo | H01M 10/425 |
| | | | 429/91 |
| 2014/0285936 A1* | 9/2014 | Garbacik | B60L 11/1866 |
| | | | 361/88 |
| 2015/0069829 A1* | 3/2015 | Dulle | B60R 16/03 |
| | | | 307/9.1 |

OTHER PUBLICATIONS

Bectron PL 4122-R, Electronic Protection System, "Urethane/Alkyd Thin Film Coating", ELANTAS Beck GmbH, Germany, pp. 1-3.
Bectron PK 4340, Electronic Protection System "Thick Film Coating, thermal cure", ELANTAS Beck GmbH, Germany pp. 1-3.
Littelfuse, Inc., Surface Mount Fuses, 451-453 Series Fuse, Sep. 10, 2015, pp. 1-3.

* cited by examiner

*Primary Examiner* — Raymond Alejandro
(74) *Attorney, Agent, or Firm* — Quinn IP Law

(57) ABSTRACT

A battery pack, a device for sensing individual battery voltages in a battery pack and protecting the battery pack in the event of a circuit-breaking event, and a method for forming an encapsulant for the voltage-sensing circuit for use in a battery-powered automobile propulsion system. The battery pack includes numerous voltage sensing circuits with surface-mounted fuses and an encapsulant formed around each of the fuses. The encapsulant is robust enough to provide environmental isolation of the surface-mounted fuse such that the tendency of the fuse to form short-circuit connections to adjacent circuits is avoided under both nor- (Continued)

mal battery pack operation and after a condition where the battery pack is compromised. The precursor to the encapsulant is made from a multiple layers of a traditional thin coating material or a single layer of a high-viscosity fluid to help maintain a minimum coating thickness around all exposed portions of the surface-mounted fuse, including the breech-prone corners.

9 Claims, 7 Drawing Sheets

CONTINUOUS CIRCUIT AND FUSE PROTECTION IN HIGH VOLTAGE APPLICATIONS EXPOSED TO CHEMICALLY HARSH ENVIRONMENTS

BACKGROUND OF THE INVENTION

This invention relates generally to voltage-sensing and protective components used in conjunction with a battery-powered system, and more particularly to a way to increase the environmental resistance of a surface-mounted voltage-sensing fuse that is used as part of a voltage monitoring and protection circuit for multiple battery cells that are formed into a larger battery assembly such as that used for automotive propulsion.

Lithium-ion and related batteries are being used in transportation applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes such batteries ideal to serve as part of a propulsion system for cars, trucks, buses, motorcycles and related vehicular platforms. In one form suitable for automotive applications, individual battery cells are combined into larger assemblies such that the current or voltage is increased to generate the desired power output. In the present context, larger module and pack assemblies are made up of one or more cells joined in series, parallel or both, and include additional structure to ensure proper installation into the vehicle. Although the term "battery pack" is used herein to discuss a substantially complete battery assembly for use in propulsive power applications, it will be understood by those skilled in the art that related terms—such as "battery unit" or the like—may also be used to describe such an assembly, and that either term may be used interchangeably without a loss in such understanding.

It is desirable as part of the electrical connectivity between the various individual cells within the battery pack, as well as between the battery pack and the electrical loads discussed above, to include voltage-sensing circuitry to allow for monitoring and the related detection of abnormal voltage conditions within the pack and various battery cells. In one form used by the Assignee of the present invention, such circuitry may be connected to measurement electronics that form a part of the vehicle's low-voltage electrical system. To perform its voltage-sensing function, such circuitry further includes fail-safe components that act as a current bridge between the high voltage battery pack and the low voltage peripheral systems within the vehicle; one preferred fail-safe component used to act as a circuit-breaker is in the form of a fuse that is made up of a filament, a ceramic body surrounding the filament to protect it during normal operation and contain it during an interrupt event, and end caps to make the connection to the circuit. In a conventional form, such a fuse is an "off-the-shelf" component which is surface-mounted (such as through reflow soldering or the like) to pads formed on a circuit board or related element that connects the individual battery cells (or small groups of such individual cells) to monitoring electronics via sense lines. Because such fuses contribute resistance to the voltage sensing circuit, any variations in fuse manufacturing lead to errors in operational consistency. This lack of consistency, as well as the need to overdesign the fuses to protect the circuitry from maximum pack voltage, leads to the use of an excessively large (i.e., high voltage-rated) fuse. This in turn necessitate that a large gap between the circuit pads be used to prevent arcing around the fuse; because the circuits are already packed fairly tightly, any such increase in fuse outer dimensions makes the circuit designer's task even more complex.

Moreover, the harsh operating environment to which vehicular fuses are exposed means that they should be encased in a protective layer as a way to isolate them from the effects of such environments. Humidity in particular tends to be disruptive of a conventional fuse's electrical function; this disruption is exacerbated at the elevated temperatures that an automotive fuse may expect to encounter. Likewise, the presence of battery pack coolant or other chemical agents may also contribute to the harsh environment. Furthermore, because battery packs used in vehicular platforms operate predominantly in a dynamic (i.e., non-stationary) environment, vibration and other motion-related activities may tend to liberate such coolant onto the exposed voltage-sensing circuits, thereby compounding an already difficult operating environment. Regardless of whether from humidity or spilled coolant (or related automotive fluids), the presence of these agents may contribute to one or both of undesirably poor electrical performance and shortened life within the voltage-sensing circuit.

An even more significant difficulty arises out of the operation of a properly-functioning fuse. In particular, it is designed to interrupt the current flow of the circuit being protected during a short circuit (such as that due to an overload condition or the like) by vaporization of the filament. During the fusing event, there is a dramatic temperature rise within the fuse up to the melting (i.e., vaporization) point of the filament such that electrical arcing occurs until enough of the filament is consumed to break the circuit and interrupt the current flow entirely. Any air surrounding the filament becomes superheated. Significantly, if the overload condition exceeds what the fuse is rated for, the body and end caps may not contain the arcing; this in turn leads to the formation of superheated gases which may propagate to other nearby components (such as adjacent voltage-sensing or related fusing circuits). While the destructive effects of such a fusing event may be halted or minimized by the use of specialized fuses (such as those rated for automotive high voltage battery packs), this entails large packaging requirements and high costs. Moreover, to the extent that such a conventional fuse may use a thin overcoating, it cannot act as a seal to shield the fuse from the local environment associated with a high voltage battery pack. The present inventors have determined that the portion of the overcoating adjacent the corners of the fuse is particularly susceptible to being breached under these harsh environmental conditions.

One particularly destructive attribute of a breech (either with or without the overcoating discussed above) is the possibility of dendritic growth (and concomitant corruption of other, previously-unaffected circuits) when exposed to the environment. For example, upon activation of the fuse as a circuit breaker in response to a high voltage (about 400V and above, for instance) short circuit, the present inventors have determined that the violent fusing may either burn a hole through the circuit's substrate material or spread out over the substrate surface, and that this has a possibility to cover the nearby area with conductive carbon that through subsequent dendritic growth into adjacent circuits can lead to other short-circuiting events. The present inventors have determined that such dendritic path formation and growth is particularly likely to form from two methods, including (a) repeated battery heating and cooling that leads to condensation (which includes both water and various conductive contaminants) inside the battery assembly, and (b) coolant leaks that arise out of various types of failure events. This dendritic formation is especially problematic in the presence of ionic aqueous deposits (such as from coolant or the like which, like the water mentioned above, may evaporate to leave conductive contaminants behind that can build up and provide the resistive short-circuit). As such, dendritic growth can occur at any point where the sensing circuit is not sealed against such an environment.

As such, what is needed is an encapsulating material that can provide protection of the fuse against its ambient environment while operating and performing its primary function in the circuit during a high voltage short circuit event in chemically harsh environments as a way to ensure the continued circuit protection. Such encapsulating material would enable the use of conventional surface-mount fuses with closely-tailored voltage ratings, which in turn allows for smaller packaging size and lower-cost materials.

SUMMARY OF THE INVENTION

In accordance with one aspect of the present invention, an assembly for sensing voltage produced by at least one battery cell within a battery pack is disclosed. The assembly includes a substrate with one or more voltage sensing circuits formed on its surface, where each such circuit includes a surface-mounted fuse (also referred to as a fusible element) that is electrically coupled to an electrically-conductive line or trace. In the present context, a surface-mounted fuse differs from an integrally-formed one through its method of fabrication. For example, the integrally-formed fuse is preferably formed by a patterning or related deposition process, whereas the discretely-formed surface-mounted version is first manufactured, then attached to the substrate through the aforementioned welding, soldering or related joining techniques. Likewise, a particular form of the substrate is as a battery interconnect board (ICB) which may have optional rigid (for example, a printed circuit board) or flexible circuit boards secured thereto. The Assignee of the present invention has found that an ICB-based approach to battery pack design provides a convenient, modular way to electrically connect numerous individual battery cells to one another within a module, as well as to other modules within the pack a way to further electrically connect the pack to the various electrical loads within the vehicle. Significantly, the coating protects the area between the pads and from the environment, which in turn permits the use of a smaller fuse and related greater space between circuits.

In addition to the fuse and trace, each voltage sensing circuit includes a conformal encapsulant around the fuse; the encapsulant being made from a precursor material that upon being coated onto the fuse and then cured becomes environmentally resistant such that the fuse is kept isolated from the ambient environment during both normal and compromised battery pack operation. In the present context, the use of the terms "coating", "depositing" or the like as action verbs are meant to include those situations where the precursor material (which is preferably in a thixotropic, semi-liquid state) is placed, poured, sprayed or otherwise formed over the fuse such that it conformally drapes or envelops the fuse. As will be discussed in more detail below, the higher levels of viscosity associated with the thixotropic precursor help ensure that minimum coating thicknesses are preserved around the substantial entirety of the fuse's exposed outer surface, especially over places where sharp bends and related discontinuities would otherwise cause a more free-flowing precursor to run off and lose coverage. Further in the present context, it will be understood that the environmental isolation afforded the fuse by the encapsulant does not prevent the fuse from permitting the normal flow of electrical current between it and the various battery cell terminals, traces, lines and other coupled circuitry, but rather that it includes containing the fuse within one or more layers of a shell-like protective covering such that the tendency to form a short-circuit with adjacent circuits through dendritic growth, tracking or related phenomena is eliminated or substantially curtailed. Moreover in the present context, the battery pack is in a compromised state when there is an event or condition that could jeopardize the proper operation of the pack, its voltage monitoring circuits or other key components. One such compromised state is when a circuit-breaking episode occurs such that one or more of the fuses becomes blown.

In accordance with another aspect of the present invention, a battery pack configured to provide propulsive power to a vehicle is disclosed. The battery pack includes numerous prismatic battery cells aligned along a stacking axis as discussed above, a housing configured to contain the cells and numerous voltage sensing circuits each of which is electrically cooperative with a respective one of the cells. Each of the circuits include one or more surface-mounted fuses formed within at least a portion of an electrically conductive voltage trace, as well as an encapsulant formed around the fuse. The encapsulant is made from an environmentally resistant material such that the fuse remains isolated from the ambient environment during both normal and compromised pack operation. It will be appreciated by those skilled in the art that the battery pack may include additional features for mechanical or electrical support, including additional frames, containers, cooling circuits or the like. For example, in a preferred optional form, the voltage sensing circuits form part of an assembly made up of a battery ICB that defines numerous busbars placed on or formed in it, as well as a circuit board cooperative with (or formed as part of) the ICB. In such configuration, the circuit board (which may be either rigid or flexible), defines the various voltage sensing circuits on its surface.

In accordance with yet another aspect of the present invention, a method of providing maintenance of coating integrity during fuse operation for an automotive propulsion system battery pack voltage sensing circuit is disclosed. The method includes coating at least one layer of a precursor onto the fuse of the voltage-sensing circuit such that the precursor substantially covers all exposed portions of the fuse that along with the remainder of the circuit is disposed on a substrate. The precursor is made from a thixotropic material; in this way, the relatively high resistance to flowing means that upon coating the precursor onto the fuse, it remains in place over a substantial entirety of the fuse, even at corners and related fuse locations where a fusing event is likely to cause a breach in the fuse's ceramic containment. Once the fuse has been coated, a curing step may be used on the precursor such that it hardens to form a substantially conformal encapsulant around the fuse. The encapsulant formed around the fuse maintains the fuse in substantial environmental isolation not only from the ambient environment during levels of the electrical current that correspond to both normal pack operation, as well as maintaining the coating integrity during fuse operation, thereby reducing or eliminating the chance of electrically corrupting other circuits.

BRIEF DESCRIPTION OF THE DRAWINGS

The following detailed description of specific embodiments can be best understood when read in conjunction with the following drawings, where like structure is indicated with like reference numerals and in which.

DETAILED DESCRIPTION OF THE PREFERRED EMBODIMENTS

Figure 1:
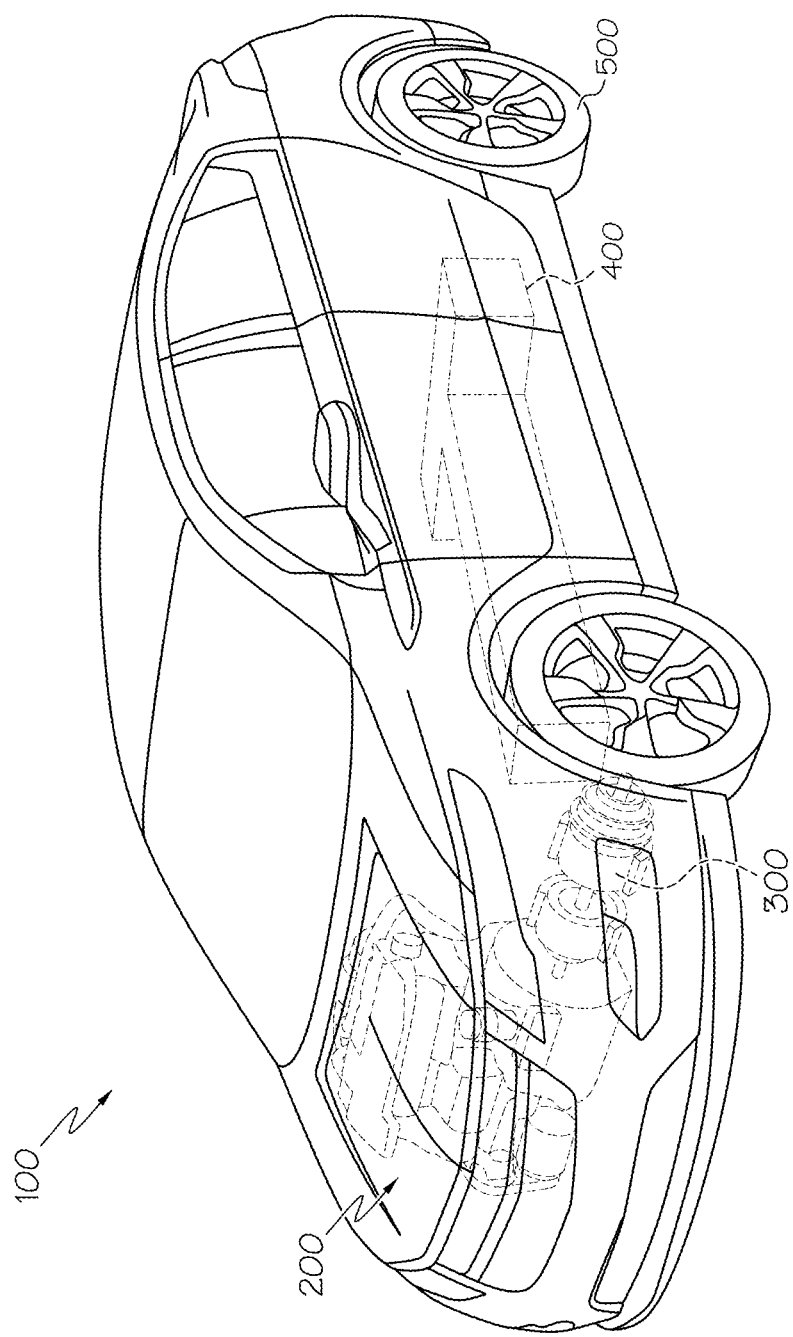
FIG. 1 is a schematic diagram of an exemplary vehicle configured with a hybrid power source, showing the integration of a battery pack with various other subcomponents of the vehicle.
Figure 2:
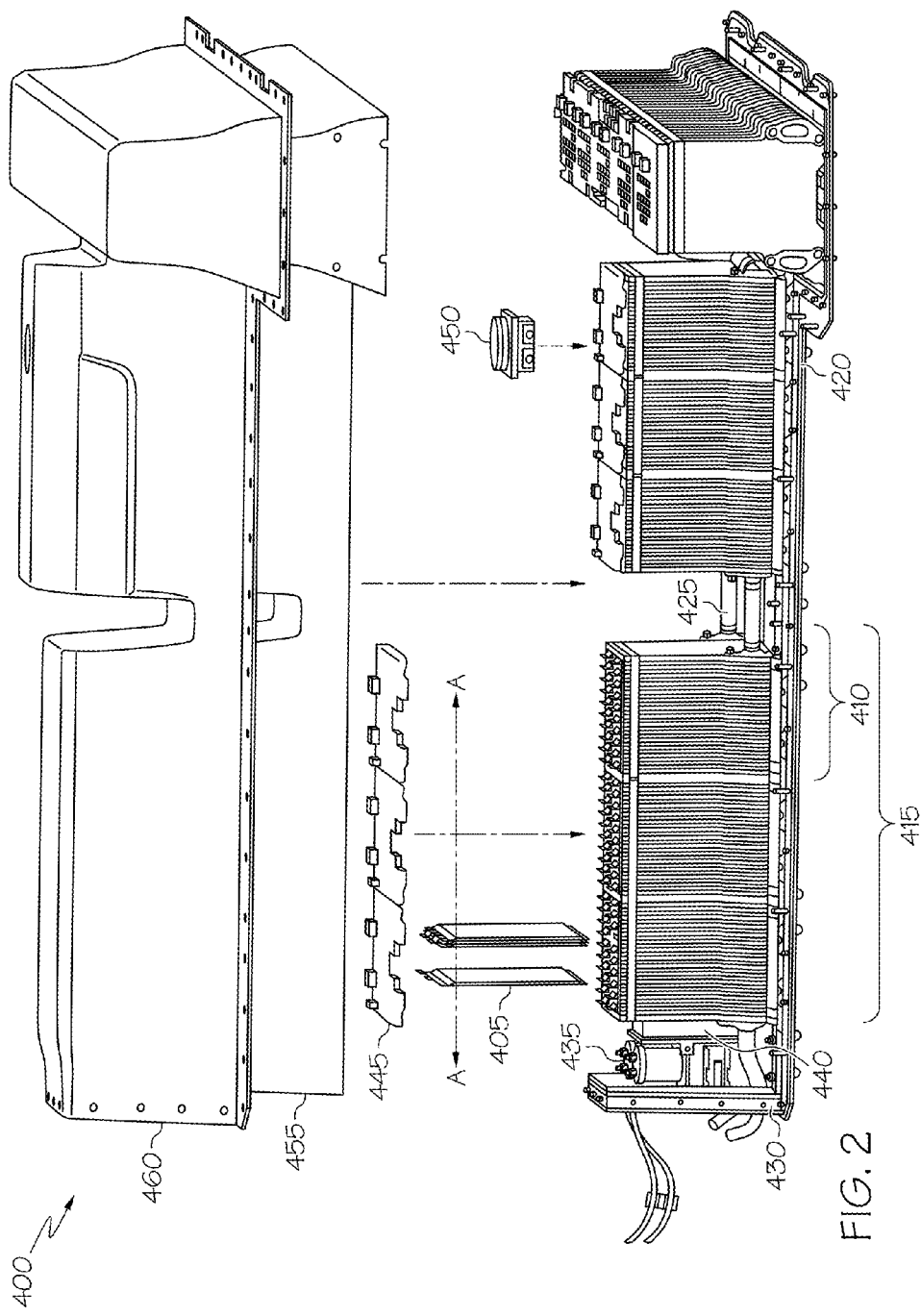
FIG. 2 is a simplified exploded view of a battery pack that can be used in the vehicle of FIG. 1.

Referring first to FIGS. 1, and 2, views of a hybrid-powered vehicle 100 (FIG. 1) and a battery pack 400 (FIG. 2) used to propel vehicle 100 are shown. Within the present context, it will be appreciated that the term "vehicle" may apply to car, truck, van sport utility vehicle (SUV) or the like. In addition to the battery 400 (also referred to herein as battery pack to emphasize the assembled nature of multiple battery cells within), vehicle 100 includes an ICE 200, one or more electric motors 300 and as well as an electronic control system (not shown). Vehicle 100 further includes a powertrain (not shown, which could be in the form of a driveshaft or the like) to deliver propulsive power from the ICE 200, motor/generator 300 or battery 400 to one or more of the wheels 500. Battery 400 may additionally include a state of charge (SOC) system and power inverter assembly (neither of which are shown), the latter of which includes various modules, including those for the IGBT and capacitors (not shown) as well as other conductive elements configured to provide a pathway for current flow between these and other associated battery-related electronic components. Busbar assemblies (portions of which are shown and discussed in more detail below) provide compact, reliable electrical connection between the various cells within the battery pack 400, as well as between the pack 400 and electrical loads throughout the vehicle 100. Although the battery pack 400 is shown in the lower central and rear of vehicle 100, it may be located in any suitable location to facilitate a preferred degree of electrical and structural coupling. In one embodiment, battery pack 400 is an assembly made up of numerous lithium ion (Li-ion) cells 405. It will be appreciated by those skilled in the art that while vehicle 100 is presently shown as a hybrid-powered vehicle, one with purely electric power (i.e., one with no need for ICE 200) is also deemed to be within the scope of the present invention.

Referring with particularity to FIG. 2, details associated with battery pack 400 are shown in a partially-exploded view. The battery pack 400 is typically made from numerous individual cells 405 that may be grouped into larger modules 410. In the present context, the terms "battery cell", "battery module" and "battery pack" (as well as their shortened variants "cell", "module" and "pack") are use to describe different levels of components of an overall battery-based power system, as well as their assembly. One common vehicular form of the battery pack being investigated by the Assignee of the present invention is known as a power battery (not shown), while another is known as an energy battery (as shown in the figure). In the power battery pack variant, the individual cells that make up a battery pack are configured as prismatic (i.e., rectangular) cans that define a rigid outer housing known as a cell case. In the energy battery pack 400 variant, the individual cells 405 are housed in a thinner, flexible prismatic pouch. Both variants can be placed in a facing arrangement (much like a deck of cards) along a stacking axis formed by the aligned plate-like surfaces. In either can or pouch form, positive and negative terminals (or tabs) extend outward from one or more of the cell 405 edges to act as contacts for connection of the internally-generated electrical current to a busbar, cabling or related common circuit.

Regardless of which variant is employed, the enclosure used for the stacked individual cells 405 needs to provide secure attachment to and containment within the corresponding vehicle 100 compartment, as well as provide proper electrical connectivity between the cells 405 and the power-consuming electrical loads within the vehicle 100. For example, numerous individual prismatic battery cells 405 are stacked in a face-to-face relationship along a stacking axis A-A such that their edges substantially align to define a generally rectangular shape. These cells 405 form the building blocks of battery modules 410 that in conjunction with ancillary equipment make up the completed battery pack 400. The usage of one or more of such terms will be apparent from the context. Although not shown, other forms of battery cells 405 may be used with the present invention, including prismatic can and cylindrical can variants. The various battery cells 405 and modules 410 may be aligned as shown to be supported by a common tray 420 that can also act as support for coolant hoses 425, headers 430, manifolds or related conduit where supplemental cooling may be desired. Moreover, the modules 415 that may be combined as a group or section 415 and aligned to be supported by common tray 420 that can also act as support for coolant hoses 425 that can be used in configurations where supplemental cooling may be desired. A bulkhead 430 may define a primary support structure that can function as an interface for the coolant hoses 425, as well as house a battery disconnect unit 435 in the event battery service is required. In addition to providing support for the numerous battery modules 410, tray 420 and bulkhead 430 may support other modules, such as a voltage, current and temperature measuring module (VITM) 440 (which acts as a centralized "brain" to aggregate the individual cell voltage information via local networking componentry such as that discussed herein. Placement of individual battery cells 405 (to be discussed in more detail below) within one of battery modules 410 is shown, as is the covering thereof by a voltage and temperature module in the form of ICB 445 that may be made to sit atop each of the three main battery sections 415 that make up the T-shaped pack 400 to communicate cell voltage information to the VITM 440. Other features, such as manual service disconnect 450, insulation 455 and a cover 460 complete the battery pack 400.

In one typical example, battery pack 400 may include about two hundred to three hundred individual battery cells 405, although (like the arrangement) the number of cells 405 may be greater or fewer, depending on the power needs of the vehicle 100. In a preferred form, the cells 405 define a prismatic construction, while in a more particular form, the cells 405 are of the prismatic pouch variety. Placement of individual battery cells 405 within battery pack 400 is shown, while the ICB 445 (that is discussed in more detail below in conjunction with FIG. 3) may be placed above the aligned cells 405 in order to provide both cell 405 mounting and electrical monitoring and control functions. In a preferred form, the present invention is applied to low current circuits (for example, below 8 amps RMS); however, it will be appreciated by those skilled in the art that it could also be used at higher current levels, and that both such uses are deemed to be within the scope of the present invention.

Figure 3:
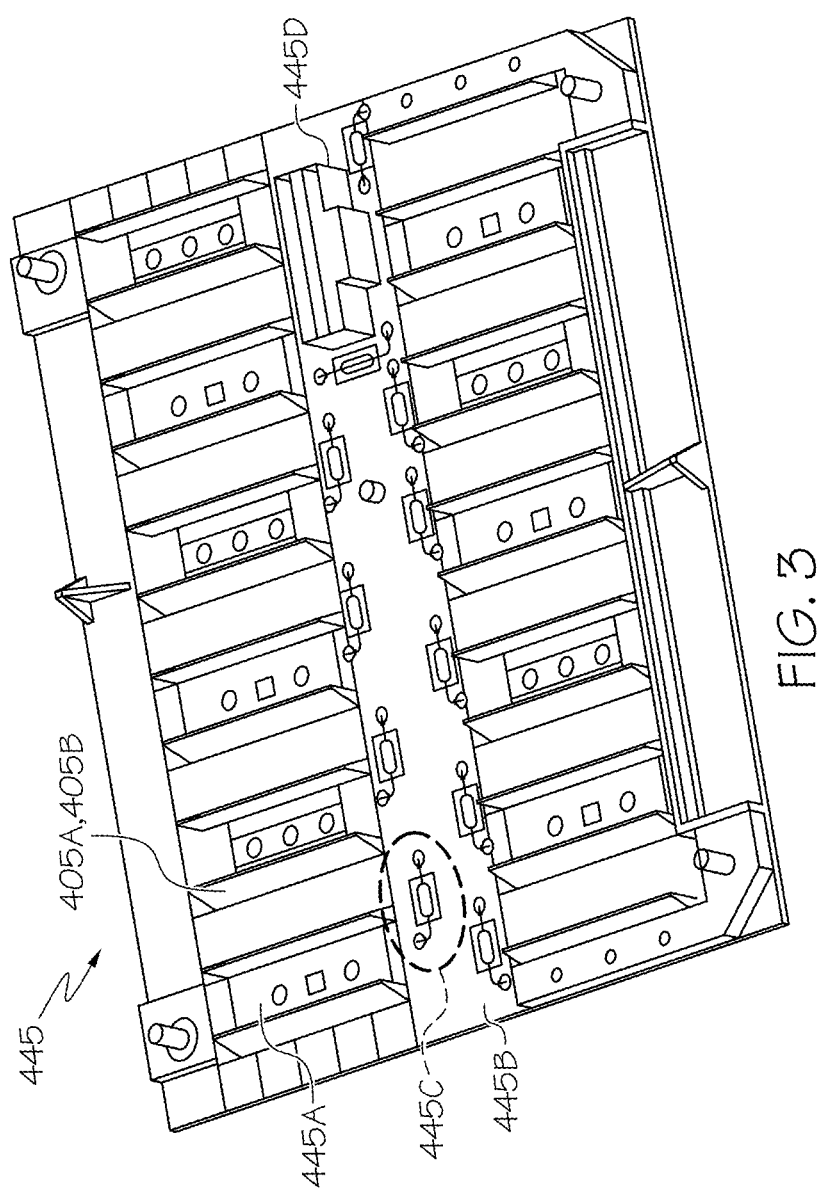
FIG. 3 shows a top perspective view of an ICB with fuse-based voltage sensing circuits that are cooperative with respective busbars and battery cell tabs according to an aspect of the present invention.
Figure 4:
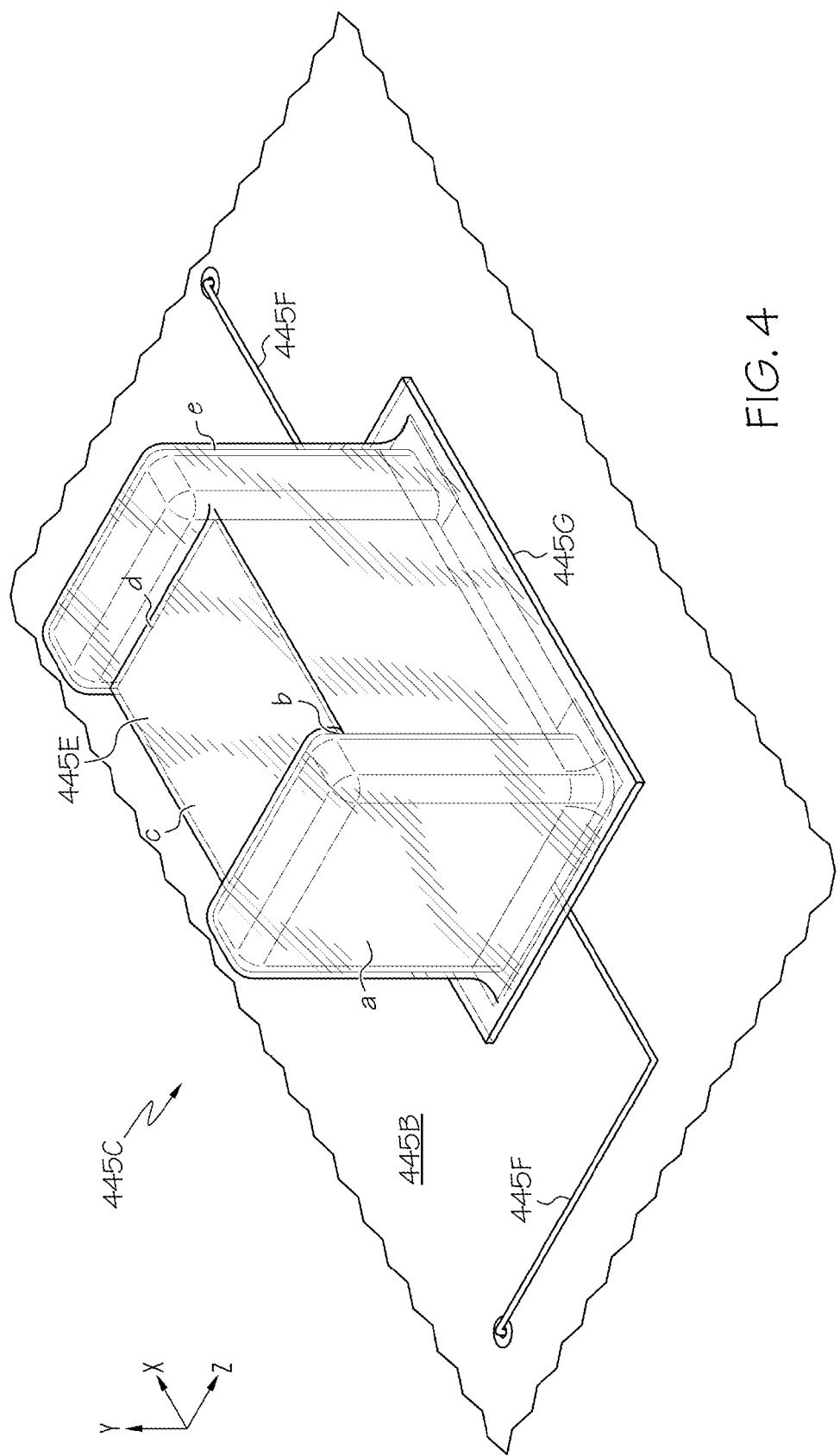
FIG. 4 shows a perspective view of the fuse portion of the voltage sensing circuit of the ICB of FIG. 3 with a conformally overmolded encapsulant according to an embodiment of the present invention, as well as locations on the fuse where measurements may be taken to verify the integrity of the encapsulant.

Referring next to FIGS. 3 and 4, a top perspective view is shown of the ICB 445 (FIG. 3) and a fuse 445E portion (FIG. 4) of a voltage-sensing circuit 445C that is formed on a circuit board 445B that is formed on or otherwise secured to the top of the ICB 445. As discussed above, the ICB 445 is used to provide electrical connectivity between numerous individual battery cells 405 and one or more of the battery disconnect unit 435, VITM 440 or other loads within vehicle 100. The ICB 445 is fixedly attached to the circuit board 445B such that numerous busbars cooperative with ICB 445 provide electrical communication between one or more of the battery cells 400 and the voltage-sensing circuit 445C. In the present context, a circuit board that is affixed to the ICB includes—in addition to conventional joining schemes such as fasteners, connectors, rivets and adhesives—those configurations where the board is integrally formed as part of the ICB 445. In particular, each busbar 445A transfers current received from one or the other of the positive and negative tabs 405A, 405B of one or more of the battery cells 405 to IGBT devices, power diodes or other components that can either convert the cell-generated DC signal to either a single-phase AC signal, or as DC power to a suitable load. Numerous individual fuses 445E as well as their corresponding voltage sensing circuits 445C are connected via similarly corresponding voltage traces (or lines) 445F. Slot-shaped apertures formed in the ICB 445 are sized and shaped to be compatible with tabs 405A, 405B that project out of the top of the pouches that make up the individual cells 405; the various busbars 445A are also sized and shaped to facilitate such receipt, and may be formed as part of a generally U-shaped channel to provide connection and mounting surfaces for the upstanding tabs 405A, 405B. The busbar-based approach is generally seen to be advantageous over cabling assemblies because (among other things) it—in addition to providing electrical connectivity—makes it possible to integrate voltage-sensing circuit 445C and related monitoring electronics via compact packaging. Furthermore, its general structure allows all of the terminals that are being used to provide electrical connection among the individual cells 405 to be reliably and repeatably positioned relative to one another through a simple assembly operation. In one form, the fuses may be the Littelfuse® Inc. 451/453 Series of surface-mount fuses, and in particular, the ones rated for 125 volts at 0.630 amps.

Referring with particularity to FIG. 4, one of the voltage-sensing circuits 445C shows the formation of the encapsulant 445G over a portion of the substrate that is in the form of circuit board 445B that can be in either a flexible, ribbon-like format or a more rigid format such as a printed circuit board. Importantly, the dimensions of the precursor material and resulting encapsulant 445G (shown presently as conformally covering the generally rectangular fuse 445E and a portion of the adjacent patterned voltage trace 445F for tracking resistance) can be made selectively thicker by adding multiple layers on top of the fuse 445E; the thixotropic nature of the precursor material is such that once it is deposited onto the shape-defining underlying fuse 445E, subsequent layers will—subject to the tendency to have sharp corners round out as a result of finite additional layer thickness—continue to generally mimic the underlying shape of the fuse 445E. In a preferred form, the encapsulant 445G forms a high-dielectric (i.e., electrically-insulative) conformal covering; this acts to suppress breeching of the encapsulant 445G during fuse 445E operation. Thus, there is no risk of resistive short circuits due to dendritic growth or tracking.

Figure 5A:
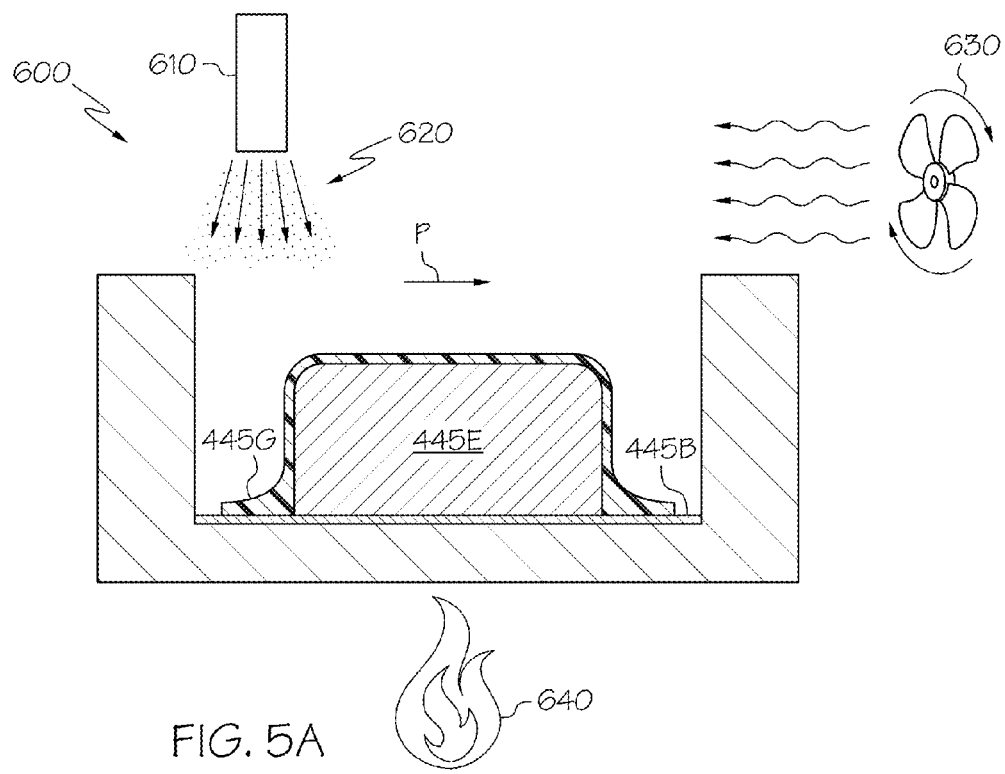
FIGS. 5A and 5B show a notional tooling placement and spray head orientation used to form the encapsulant onto the fuse of FIG. 4.
Figure 5B:
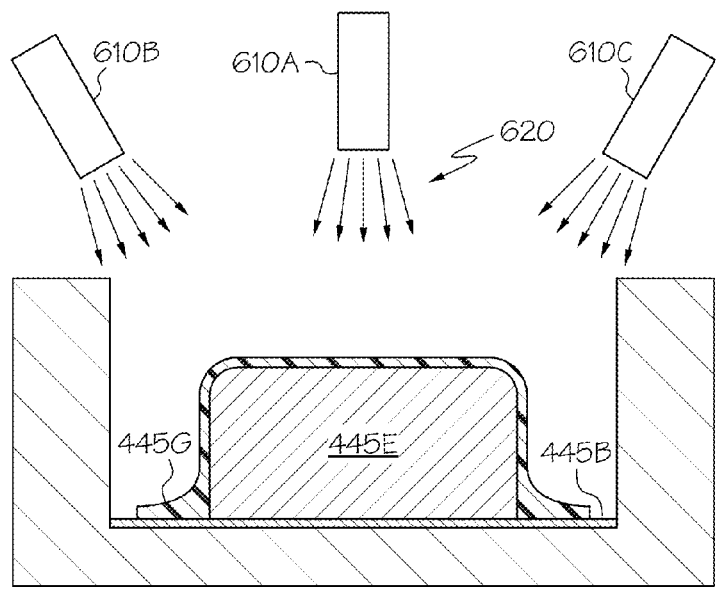
Figure 6A:
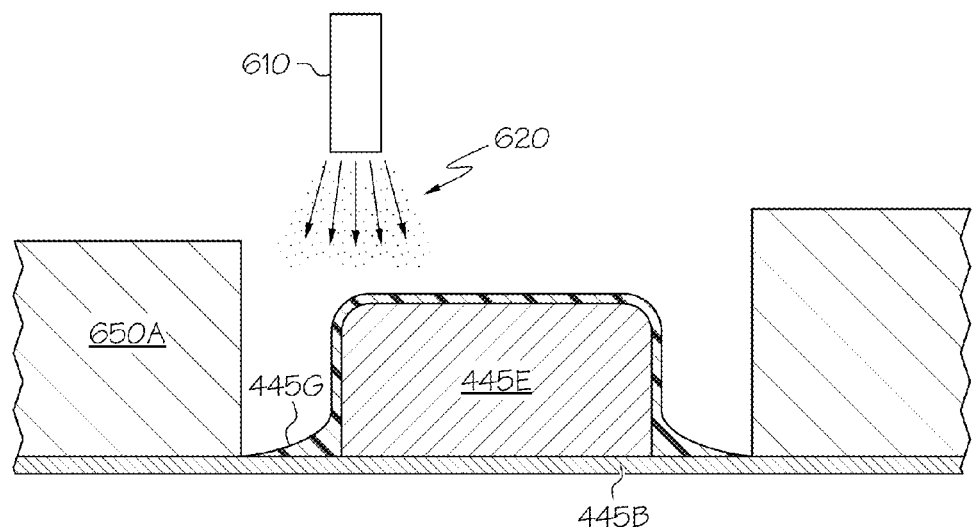
FIGS. 6A through 6D show four different masking options for the spray heads of FIGS. 5A and 5B.
Figure 6B:
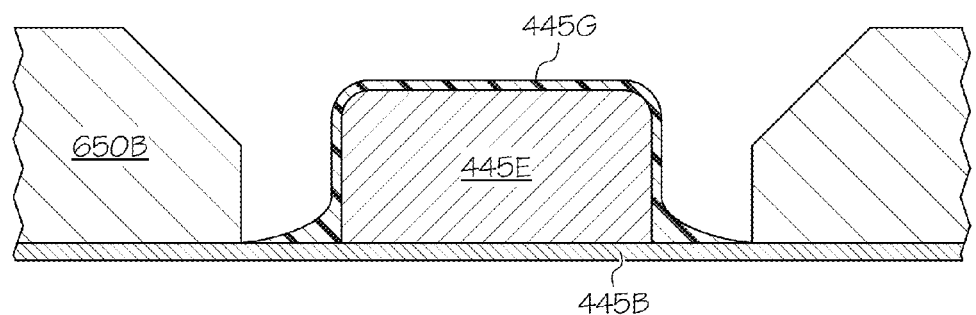
Figure 6C:
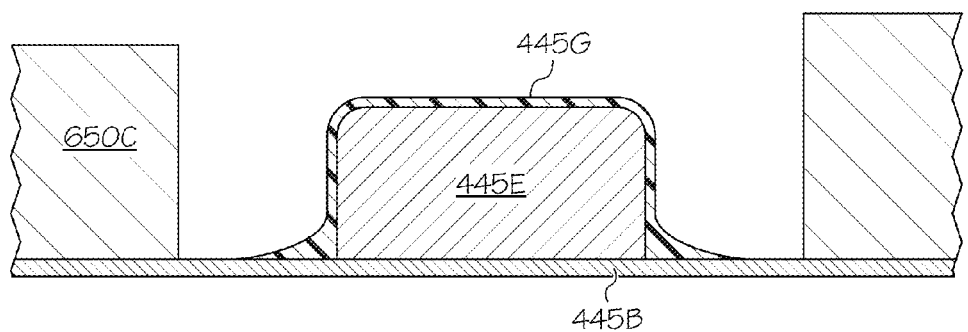
Figure 6D:
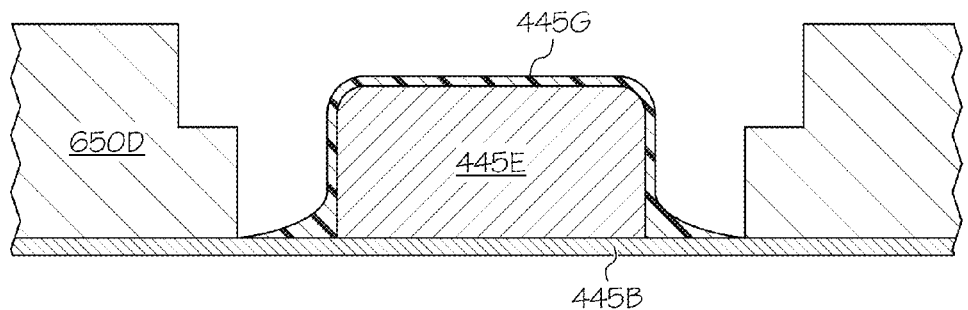

FIGS. 5A and 5B show two notional ways in which the precursor material 620 may be applied over the fuse 445E as a coating in order to have it be cured into the encapsulant 445G. In one form, the precursor material 620 defines a thin coating that is used for a multilayer variant of the conformal encapsulant 445G; such a precursor 620 is a urethane/alkyd thin film coating such as Bectron's® PL 4122-R Electronic Protection System coating (including its PL 4122-47R sub-variant). Desirable dielectric properties include permittivity (preferably at least about 3.5 times the permittivity of free space at 23° C. at 10 kHz), dielectric dissipation factor (at least about 0.02, preferably at least 0.023 at 23° C. at 10 kHz), dielectric strength (at least about 100, preferably at least 108 kV/mm at 23° C.), volume resistivity (at least about $10^{15}$ ohms·cm at 23° C.) and tracking resistance (of at least about 600 CTI). It is fast curing at room temperature or oven cure conditions to help ensure that the well-defined edges and related coating thickness remain during the time it takes to cure. Significantly, such a precursor 620 is useful in multilayer coating situations where curing times and temperatures may be tailored. In other preferred forms, the coating material is lead-free and has no aromatic compounds in the solvent, while its composition is such that it does not significantly contribute to pin corrosion. Importantly, the material has excellent thermal and dielectric properties that remain even when subjected to environmental stress. Furthermore, the cured encapsulant 445G formed from the precursor material 620 is able to withstand high temperature automotive environments, for example, over 100° C. in general and over 130° C. in particular. Other beneficial properties includes high volume resistivity (including maintaining such properties in humid conditions) while being able to resist moisture and corrosive chemicals. In addition, both the precursor material 620 and the cured encapsulant 445G high adhesion to the materials used to form the circuit board 445B or related substrate surfaces, while also satisfying the Restriction of Hazardous Substances Directive (RoHS) that limits the use of hazardous substances in electrical and electronic equipment. Lastly, the material is light-permeable, making it well-suited to permit inspection of the coated or covered areas with ultraviolet or related light.

In another form, the precursor material 620 used for a single layer variant of the conformal coating is thicker, and has more thixotropic qualities, an example of which is Bectron's® 4340 Electronic Protection System coating. Unlike the Bectron's® PL 4122-R Electronic Protection System coating discussed above, such a coating requires only one layer, but is not light-permeable and has slightly different characteristics. In addition to providing the same properties discussed above in conjunction with PL 4122-R, its thixotropic behavior readily permits edge coverage with a single layer. Moreover, the thixotropic nature of this version of the precursor material 620 is made for selective dispensing, such as through the robotic methods shown in the figures. As with the thin-layer variant discussed above, the thick-layer variant of the precursor material 620 could be either thermally cured via air-based 630 or oven-based 640 methods.

As can be seen, a separate solder is placed in the lower corners formed by the placement of the fuse 445E and the circuit board 445B, and is a separate material fillet used to join the fuse 445E to the circuit board 445B in advance of the application of the precursor material 620 which must cover the fuse 445E, solder fillet, and any exposed circuit pad.

Referring next to FIGS. 6A through 6D in conjunction with FIG. 5B, optional masks 650A through 650D may be selectively introduced to help shield parts of the circuit board 445B from unwanted precursor material 620 deposition, as well as providing access to all surfaces of the fuse 445E to ensure substantially complete encapsulation. Variations include one with a rectangular edge 650A in FIG. 6A, a tapered/beveled edge 650B in FIG. 6B, a larger opening edge 650C in FIG. 6C and a counterbore edge 650D in FIG. 6D. Thus, for the voltage-sensing circuit-specific applications discussed herein, apertures formed in such masks 650A through 650D may include the various sizes, tapers and counterbore as shown. In particular, the counterbore-based tool design was selected based on a lower standard deviation even though it had a lower average thickness. The correct values associated with such size, taper and counterbore are selected based on ability to fully encapsulate the fuse 445E.

The present inventors have determined that the nature of the precursor material 620 (whether of the single layer or multilayer variants) is such that it first forms a uniform layer over the fuse 445E, particularly at the vulnerable fuse corners b and d (as shown in FIG. 4), as the high viscosity helps to prevent liquid run-off; in this way, the coated layer's shape retains its definition at such corners b, d prior to it being hardened by curing. In one form, a robotic nozzle 610 may be used as part of an ink-like deposition process that may be used to help the precursor material 620 rapidly regain its viscosity upon deposition. As shown with particularity in FIG. 5A, the nozzle 610 may be moved along a generally linear path P relative to the fuse 445E, while in another (as shown with particularity in FIG. 5B, the nozzle 610A may be moved around the fuse 445E along three different axes of rotation such that it can be situated normally relative to it in order to apply the precursor material 620 to its generally broader, planar surfaces, while permitting other nozzles 610B and 610C are angled relative to the fuse 445E so that they can deposit the precursor material 620 to the edges or corners (such as corners b and d).

Significantly, the thickness of the resulting encapsulant 445G must be sufficient to ensure that the integrity of the encapsulant 445G is maintained during all fuse 445E operations such that it prevents breeches in the encapsulant 445G, thereby avoiding any chance of corrupting adjacent circuits on the circuit board 445B. Importantly, by providing a suitable encapsulant 445G, the applied coating helps to ensure that the size (i.e., voltage rating) of the fuse 445E is closely tailored to the needs of the circuit being monitored, thereby avoiding the use of an overdesigned (and therefore prohibitively expensive) fuse to help provide the monitoring and electrical protection functions. In a preferred form, the use of the encapsulant 445G permits the use of a smaller (i.e., more closely-tailored) excess voltage margin that is no more than about 300% overdesigned. For example, on a fuse 445E that is designed to open at 125 volts (such as the Series 451/453 ones mentioned above), the use of the encapsulant 445G discussed herein may help to avoid having to rely upon an overdesigned fuse capable of withstanding up to about 390 volts. Thus, rather than using a relatively expensive fuse with a minimum required rating of 250 volts for a 390 volt test with a conventional thin coating, the conformal encapsulant 445G of an embodiment of the present invention can get by using a less expensive fuse with a rating of 125 volts for the same 390 volt test with complete encapsulation at a target thickness of about 80 μm. Moreover, the present inventors have determined that adequate encapsulant 445G thickness is a critical dimension to ensure that the voltage-sensing circuit 445C be able to pass battery pack 400 resistive short circuit testing (during validation) as well as short circuit protection over its service life in the battery pack 400, and that such thickness is preferably at least about 80 μm when used in conjunction with the voltage-sensing circuit 445C of battery pack 400, although it is possible that validation testing may show that variations of this thickness requirement may be possible; such thickness variations are deemed to be within the scope of the present invention. As such, in both the configuration that employs multiple layers of conformal encapsulant 445G as well as the configuration that employs a single, thicker layer (such as those based on a thixotropic precursor), the thickness is sufficient to ensure fuse isolation from the ambient battery environment over the projected life of the battery pack. This more efficient, compact use of fuse 445E resources has significant ramifications for the remainder of the components used in the voltage-sensing circuit 445C, particularly as it relates to the ability to employ smaller, less expensive components that can be more tightly packed onto the same circuit board 445B or related substrate.

Referring again to FIG. 4, measurement of the conformal coating 445G thickness is preferably measured via cross section in two different planes, the first being the X-Y plane and the other being the Y-Z plane. Preferably, each cross section direction has four measurement points that can be chosen to coincide with conventional fuses that had coatings that did not meet the thickness criteria. In particular, the present inventors have found that the corners (such as the internal corners b, d or their outer corner equivalents) and vertical walls (such as locations a and e) are difficult locations to achieve the requirement. Likewise, the flat measurement location at location c may be used for reference because conformal coating requirements are typically measured on a flat substrate per Institute of Printed Circuits (IPC) guidelines for qualification, testing and reporting. As mentioned above, the corners b and d are generally deemed to be the most critical location in that they correspond to the location where the fuse 445E is likely to breech during application of the coating, as well as during fuse operation.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, for the purposes of describing and defining the present invention it is noted that the term "substantially" is utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

For the purposes of describing and defining the present invention it is noted that the terms "battery", "battery pack" or the like are utilized herein to represent a combination of individual battery cells used to provide electric current, preferably for vehicular, propulsive or related purposes. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of providing protection for a voltage-sensing circuit of an automotive propulsion system battery pack, the method comprising:
   disposing the voltage-sensing circuit on a substrate such that the voltage-sensing circuit is cooperative with at least one battery cell, the voltage-sensing circuit comprising a fuse and a voltage trace, the fuse being surface mounted, the voltage trace being electrically coupled to the fuse, the voltage-sensing circuit configured to provide indicia of an electrical condition of the at least one battery cell;
   coating a precursor onto the fuse such that the precursor substantially covers all exposed portions of the fuse, the precursor configured to substantially remain as coated over the exposed portions of the fuse during an entirety of the coating; and
   curing the precursor to thereby form an encapsulant, the encapsulant being substantially conformal around the fuse, the encapsulant being environmentally resistant material such that the fuse is isolated from an ambient environment during normal battery pack operation and after the battery pack is compromised.

2. The method of claim 1, wherein coating the precursor onto the fuse comprises using a tool comprising at least one spray nozzle configured to deposit an encapsulant precursor onto the substrate and the voltage-sensing circuit that has been placed in a containment structure.

3. The method of claim 2, wherein the tool further comprises at least one mask disposed between the spray nozzle and the substrate such that upon passage through the at least one mask, placement of the encapsulant precursor is confined to an area substantially defined by an aperture formed in the mask.

4. The method of claim 3, wherein an angular orientation of at least one of the at least one spray nozzle relative to the substrate and the voltage-sensing circuit is adjusted over course of a travel path of the at least one spray nozzle.

5. The method of claim 4, wherein the mask defines a beveled structure.

6. The method of claim 4, wherein the mask defines a counterbore structure.

7. The method of claim 1, wherein coating the precursor onto the fuse includes applying at least one layer and the at least one layer has a total thickness of at least about 80 µm at substantially every location corresponding to the exposed portion.

8. The method of claim 1, wherein the curing is selected from the group consisting of air curing and oven curing.

9. The method of claim 1, further comprising attaching, to a circuit board, the fuse via soldering a separate solder to thereby join the fuse to the circuit board via a separate material fillet, the attaching occurring prior to coating the precursor onto the fuse thereby covering the fuse, a solder fillet, and an exposed circuit pad, wherein the encapsulant forms a high-dielectric conformal covering, the encapsulant consists essentially of an alkyd-modified urethane, the encapsulant has a permittivity of at least about 3.5 times a permittivity of free space when measured at 23° C. at 10 kHz, a dielectric dissipation factor of at least about 0.023 when measured at 23° C. at 10 kHz, a dielectric strength of at least about 108 kV/mm at 23° C., a volume resistivity of at least about $10^{15}$ ohms·cm when measured at 23° C., and a tracking resistance of at least about 600 CTI, the precursor includes at least one layer, the substrate includes the circuit board with a battery interconnect board fixedly attached to the circuit board such that a plurality of busbars cooperative therewith provide electrical communication between the at least one battery cell and the voltage-sensing circuit, the encapsulant is able to withstand operating environments over 130° C., and the encapsulant is light-permeable, the encapsulant is deposited in a substantially uniform layer over the fuse, the precursor is applied with a plurality of nozzles, the plurality of nozzles includes a first nozzle oriented perpendicular to the circuit board, a second nozzle oriented at a first oblique angle to the circuit board, and a third nozzle oriented at a second oblique angle to the circuit board, the precursor has a first viscosity, the first viscosity is selected such that the precursor retains a deposited shape until transitioning to the encapsulant, the precursor being applied by a deposition process via the plurality of nozzles, the precursor configured to have a second viscosity upon exiting the plurality of nozzles, the first viscosity being less than or greater than the first viscosity, the deposition process is configured to regains the first viscosity upon deposition, the encapsulant defines a thickness, the thickness is selected such that the encapsulant prevents breaches thereof during a fusing event, the fuse having less than about 300% overdesign for a designed purpose, the thickness being about 80 the fuse defining a rating of less than about 50% of an unencapsulated fuse for the designed purpose.

* * * * *